United States Patent [19]

Hayashi

[11] Patent Number: 5,534,469
[45] Date of Patent: Jul. 9, 1996

[54] LOW TEMPERATURE NON-CRYSTALLIZING SEALING GLASS

[75] Inventor: Masaaki Hayashi, Shiga-ken, Japan

[73] Assignee: Nippon Electric Glass Co., Ltd., Otsu, Japan

[21] Appl. No.: 526,910

[22] Filed: Sep. 12, 1995

[51] Int. Cl.⁶ .................................. C03C 8/10; C03C 8/24
[52] U.S. Cl. ........................ 501/15; 501/17; 501/22; 501/26; 501/76
[58] Field of Search ........................ 501/15, 17, 22, 501/26, 76, 79

[56] References Cited

U.S. PATENT DOCUMENTS

| | | | |
|---|---|---|---|
| 4,004,936 | 1/1977 | Powell | 501/15 |
| 4,774,208 | 9/1988 | Ymanaka et al. | 501/15 |
| 5,298,329 | 3/1994 | Boatner et al. | 501/15 X |
| 5,346,863 | 9/1994 | Hakata et al. | 501/22 X |

FOREIGN PATENT DOCUMENTS 863500  3/1961  United Kingdom .

*Primary Examiner*—Karl Group
*Attorney, Agent, or Firm*—Collard & Roe

[57] ABSTRACT

As a sealing composition which can seal a panel and a funnel of a color CRT at a relatively low temperature for a relatively short time, a non-crystallizing sealing glass essentially consists of $PbO-ZnO-B_2O_3-Bi_2O_3-Cs_2O$ system and has a thermal expansion coefficient of 80 to $95\times10^{-7}/°C$. The sealing glass can be used as a mixture with 40 to 5 volume percent of refractory filler powder. The $PbO-ZnO-B_2O_3-Cs_2O$ system glass consists essentially of, by weight, 65–80% of PbO, 5.5–8% of $B_2O_3$, 3–9% of ZnO, 7–22% of $Bi_2O_3$, 16% or more of ZnO +$Bi_2O_3$, 0.2–1% of $SiO_2$, 0.3–2% of $Fe_2O_3$, and 1.5–4.5% of $Cs_2O$. The refractory filler is at least one element selected from tin oxide, lead titanate, and zinc silicate.

4 Claims, 2 Drawing Sheets

LOW TEMPERATURE NON-CRYSTALLIZING SEALING GLASS

BACKGROUND OF THE INVENTION

The present invention relates to a sealing glass and, particularly, to a non-crystallizing sealing glass adaptable for sealing a glass panel and a glass funnel of a cathode-ray-tube (CRT) such as a color television tube.

As a sealing glass for the glass panel and the glass funnel of the CRTs, the crystallizing glass of the $PbO—B_2O_3—ZnO—SiO_2$ type which is disclosed in British Patent No. 863500 has been known. The known sealing glass can be crystallized within a period of one hour at 450° C. Since the known sealing glass has an elevated melting point after crystallization, it can provide a heat resistant seal. Accordingly, when the sealed bulb is again heated to the temperature between 350°–400° C. for an evacuation process during CRT production, the off-set between the panel and the funnel will not occur.

Therefore, the known crystallizing glass is preferable for the production of CRT bulbs which are subjected to a heat cycle after the sealing process.

Recently, the evacuating method has been improved so that evacuation can be carried out at a lower temperature than before. Therefore, the seal need not have the high heat resistance so much as before. On the contrary, it is required for the sealing glass to be possible to form a seal at a low temperature for a short time from the view points of a reduction in consumed energy and economization of the production.

However, the known crystallizing sealing glass requires to be fired, depending on the bulb size, at 440°–460° C. for 30–60 minutes in order to obtain the perfectly crystallized seal.

SUMMARY OF THE INVENTION

It is an object of the present invention to provide a sealing glass which can form a seal at a relatively low temperature for a relatively short time in comparison with the known crystallizing sealing glass.

It is a specific object of the present invention to provide a non-crystallizing sealing glass to seal a glass panel and a glass funnel of a color CRT.

According to the present invention, there is provided a non-crystallizing sealing glass essentially consisting, by weight, of 65–80% of PbO, 5.5–8% of $B_2O_3$, 3–9% of ZnO, 7–22% of $Bi_2O_3$, 16% or more of $ZnO+Bi_2O_3$, 0.2–1% of $SiO_2$, 0.3–2% of $Fe_2O_3$, and 1.5–4.5% of $Cs_2O$.

According to another aspect of the present invention, there is provided a non-crystallizing sealing composition comprising, by volume, 60–95% of the non-crystallizing glass powder and 40–5% of refractory filler powder. The refractory filler powder may be at least one element selected from the group of tin oxide, zircon, zinc silicate, and lead titanate.

The non-crystallizing sealing composition has a thermal expansion coefficient of $80–95 \times 10^{-7}/°C$.

DESCRIPTION OF THE INVENTION

Figure 1:
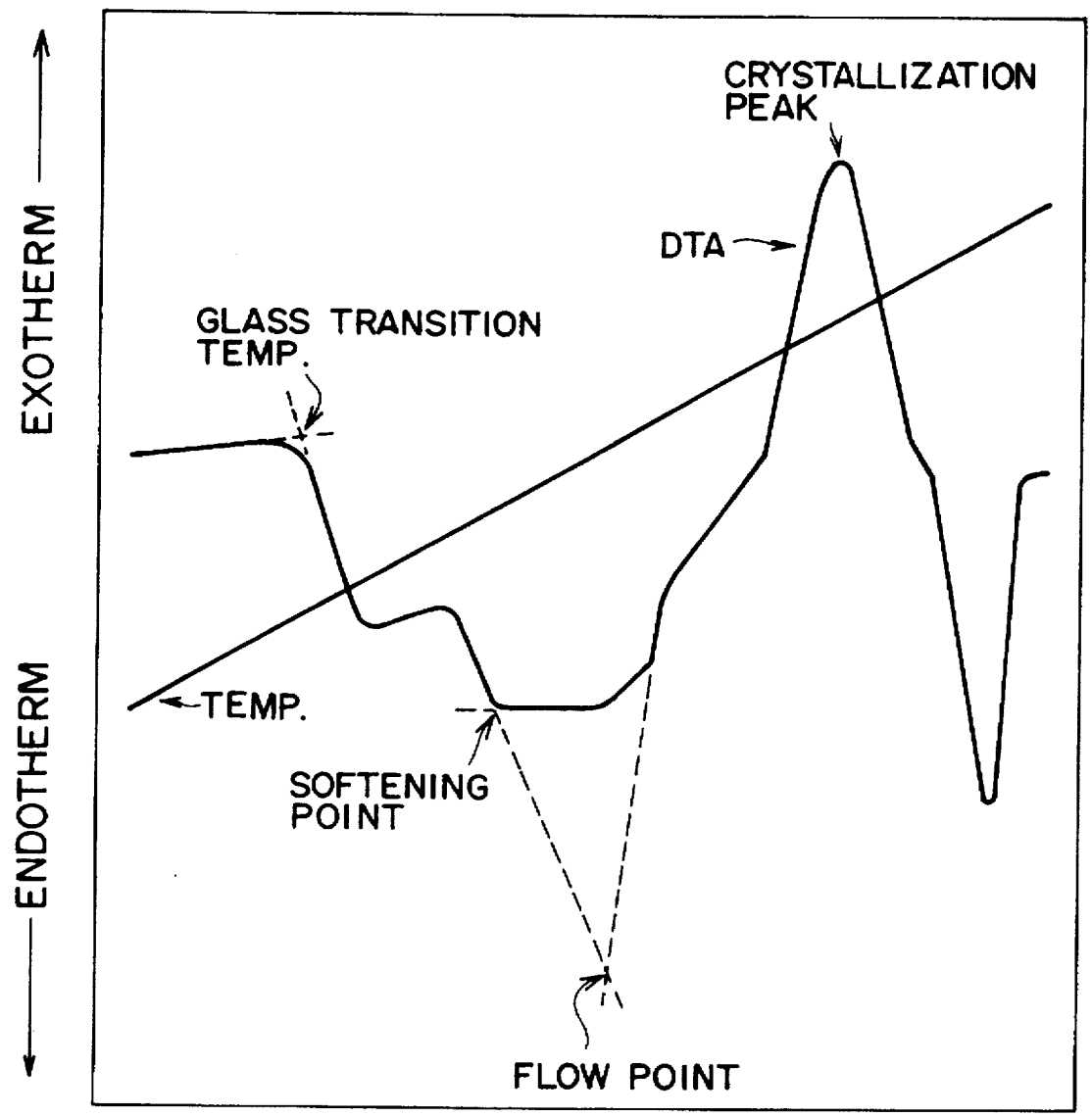
FIG. 1 is a schematic diagram showing an exothermic and endothermic property of a known crystallizing sealing glass measured by a differential thermal analysis (DTA) apparatus.

A sealing glass according to the present invention essentially consists, by weight, of 65–80% of PbO, 5.5–8% of $B_2O_3$, 3–9% of ZnO, 7–22% of $Bi_2O_3$, 16% or more of $ZnO+Bi_2O_3$, 0.2–1% of $SiO_2$, 0.3–2% of $Fe_2O_3$, and 1.5–4.5% of $Cs_2O$. The sealing glass has a highly stable vitreous structure and an excellent flowability. In addition, the sealing glass contains a specific amount of $Cs_2O$ which lowers a softening point and a flow point, so that the sealing can be easily carried out at a relatively low temperature for a relatively short time.

Now, description will be made as to a reason of the limitation of the amount of constituents of the sealing glass according to the present invention.

When the amount of PbO is more than 80%, the glass devitrifies. When the amount of PbO is less than 85%, the sealing temperature will become too high. Therefore, PbO in the glass is 65 to 80%, preferably, 67 to 78%.

The glass contains 5.5 to 8% of $B_2O_3$, preferably 6 to 7.5%. When the amount of $B_2O_3$ is more than 8%, the glass becomes less stable and, in addition, its chemical durability becomes very low. When the amount of $B_2O_3$ is less than 5.5%, both the meltability and the flowability of the glass are poor.

The glass contains 3 to 9%, preferably, 3 to 8% of ZnO. When the amount of ZnO is more than 9%, or less than 3%, the glass is devitrifiable.

The glass contains $Bi_2O_3$ more than 7% to improve the flowability. However, when the amount is more than 22%, the glass is devitrifiable. Therefore, the amount is 7 to 22%, preferably, 8 to 20%.

A total amount of ZnO and $Bi_2O_3$ is required to be 16% or more. When the total is less than 16%, the glass can hardly be stable.

$SiO_2$ is used by the amount of 0.2% or more to stabilize the glass. However, when the amount of $SiO_2$ is more than 1%, both the softening point and the flow point are too high, and the sealing temperature, therefore, is also too high. Therefore, the amount of $SiO_2$ is 0.2 to 1%, preferably, 0.3 to 0.8%.

$Fe_2O_3$ is also a constituent for stabilizing the glass and is used by the amount of 0.3% or more. However, when the amount of $Fe_2O_3$ is more than 2%, the softening point and the flow point are too high. Therefore, the amount of $Fe_2O_3$ is 0.3 to 2%, preferably, 0.8 to 1.5%.

$SiO_2$ and $Fe_2O_3$ are both necessary to stabilize the sealing glass of the present invention. A total amount of $SiO_2$ and $Fe_2O_3$ is preferably 1.0 to 2.5%. When the total amount of $SiO_2$ and $Fe_2O_3$ is less than 1.0%, the glass becomes unstable, and when it is more than 2.5%, the sealing temperature of the glass becomes too high.

$Cs_2O$ is used for lowering the softening point of the glass. When the amount of $Cs_2O$ is more than 4.5%, the glass is devitrified. When the amount of $Cs_2O$ is less than 1.5%, the softening point is, therefore, not lowered enough. Therefore, the amount of $Cs_2O$ is 1.5 to 4.5%, preferably, 1.5 to 4%.

The sealing glass of the present invention has the glass transition temperature of about 270° to 285° C. and the softening point of about 340° to 350° C. The sealing glass is non-crystallizing so that it has an excellent flowability.

Therefore, the seal can be obtained by heating the sealing glass at a low temperature of about 390° to 410° C. for a short time of about 5 to 15 minutes.

In the view point of a thermal expansion coefficient, the sealing glass of the present invention does not always match the materials of component parts to be sealed.

In order to match the thermal expansion coefficient between the seal and the components sealed, the sealing glass is used as a mixture with appropriate refractory filler.

The mix of the refractory filler with the sealing glass can also be made to adjust flowability of the sealing composition and to enhance mechanical strength of the seal formed.

In the present invention, when the sealing glass is used together with the refractory filler powder, the mixture is made with 60 to 95 volume percent of the glass powder and 40 to 5 volume percent of the refractory filler powder, preferably, 65 to 83 volume percent of the glass powder and 35 to 17 volume percent of the refractory filler powder.

When the glass powder is less than 60 vol %, or the refractory filler powder is more than 40 vol %, the mixture or the sealing composition has a poor flowability so that a good seal is not attained. The seal does not become a sintered body with a densified fine structure.

On the other hand, when the glass powder is more than 95 vol %, or the filler powder is less than 5 vol %, the effect of the filler can hardly be obtained.

As the refractory filler, tin oxide, zinc silicate, lead titanate, zircon, and alumina can be used alone or in mixture.

In use of the non-crystallizing sealing glass according to the present invention for sealing the panel and the funnel of the color CRT, it is preferably mixed with the refractory filler so as to adjust the thermal expansion coefficient within a range between 80 and $95 \times 10^{-7}$/°C. over the temperature range of 30° to 250° C.

When the sealing composition has the thermal expansion coefficient within the above range, the stress of about 450 to 1000 psi (T) resides in the color CRT bulb and high seal strength can be obtained.

However, when it does not, the color CRT bulb is subjected to unusual stress so that the bulb is easily broken from the portions of the seal, the glass panel and/or the glass funnel.

EXAMPLES

Description will be made as regards some examples of the non-crystallizing sealing glass and the composition according to the present invention.

Tables 1 and 2 show the constituents and the properties of samples A to H of the non-crystallizing sealing glass according to the present invention. Sample I is a comparative sample which is a crystallizing sealing glass known in the prior art.

TABLE 1

| SAMPLES | A | B | C | D | E | F |
|---|---|---|---|---|---|---|
| | | | | | (weight %) | |
| PbO | 72.3 | 68.1 | 72.6 | 72.1 | 70.3 | 74.7 |
| $B_2O_3$ | 7.5 | 5.7 | 6.2 | 6.2 | 6.1 | 6.0 |
| ZnO | 4.0 | 3.0 | 3.8 | 3.8 | 3.7 | 4.3 |
| $Bi_2O_3$ | 12.5 | 20.0 | 14.0 | 14.0 | 13.9 | 12.0 |
| $SiO_2$ | 0.8 | 0.3 | 0.4 | 0.5 | 0.6 | 0.3 |
| $Fe_2O_3$ | 1.4 | 0.9 | 1.0 | 1.4 | 1.4 | 1.1 |
| $Cs_2O$ | 1.5 | 2.0 | 2.0 | 2.0 | 4.0 | 1.6 |
| Glass Transition | 284 | 275 | 279 | 283 | 278 | 280 |

TABLE 1-continued

| SAMPLES | A | B | C | D | E | F |
|---|---|---|---|---|---|---|
| | | | | | (weight %) | |
| Temperature (°C.) | | | | | | |
| Softening Point (°C.) | 339 | 340 | 345 | 343 | 343 | 346 |
| Flow Point (°C.) | 373 | 370 | 365 | 375 | 377 | 367 |
| Crystallization Peak (°C.) | — | — | — | — | — | — |
| Thermal Expansion Coefficient ($\times 10^{-7}$/°C.) | 129 | 137 | 131 | 131 | 142 | 133 |

TABLE 2

| SAMPLES | G | H | I |
|---|---|---|---|
| | | (weight %) | |
| PbO | 70.4 | 71.3 | 74.8 |
| $B_2O_3$ | 6.0 | 6.1 | 8.9 |
| ZnO | 6.0 | 3.8 | 12.2 |
| $Bi_2O_3$ | 13.7 | 13.8 | — |
| $SiO_2$ | 0.5 | 0.5 | 2.1 |
| $Fe_2O_3$ | 1.4 | 1.5 | — |
| $Cs_2O$ | 2.0 | 3.0 | — |
| BaO | — | — | 2.0 |
| Glass Transition Temperature (°C.) | 285 | 281 | 321 |
| Softening Point (°C.) | 340 | 245 | 398 |
| Flow Point (°C.) | 373 | 369 | 428 |
| Crystallization Peak (°C.) | — | — | 520 |
| Thermal Expansion Coefficient ($\times 10^{-7}$/°C.) | 130 | 140 | 106 |

Each of the samples A to I was prepared as follows.

The starting materials, that is, lead oxide, boric acid, zinc oxide, bismuth oxide, silicon dioxide, iron oxide, cesium carbonate, and barium carbonate were mixed in a ratio as shown in Table 1. The mixture was put into a platinum crucible and was melted at 800° C. for an hour into a molten glass. Thereafter, the molten glass was flown out of the crucible onto a cooling plate to form a glass film. The glass film was crashed and sieved to obtain a sample powder with an average particle size of 5 μm.

The sample powder was analyzed by a differential thermal analysis to obtain a DTA curve as shown in FIG. 1.

From FIG. 1, the glass transition temperature, the softening point, the flow point, and the crystallization peak were determined.

A thermal expansion coefficient was measured by a dilatometer after the glass was ground into a rod with 40 mm in length and 4 mm in diameter.

As shown in Tables 1 and 2, it is obvious that each of the glasses corresponding to the samples A to H according to the present invention has a glass transition temperature of 275° to 285° C., a softening point of 339° to 346° C., a flow point of 365° to 377° C., and a thermal expansion coefficient of 129 to $142 \times 10^{-7}$/°C. over the temperature range of 30° to 250° C.

Furthermore, none of the glass samples A to H has the crystallization peak.

The glass sample I of the prior art has a glass transition temperature at 321° C., a softening point at 398° C., a flow point at 428° C., and a thermal expansion coefficient of $106 \times 10^{-7}$/°C. Furthermore, it has a crystallization peak at 520° C.

Tables 3 through 5 show the sample mixtures Nos. 1 to 12 which comprise the glass samples A to H and the refractory fillers.

The sample mixtures Nos. 13 and 14 were prepared by mixing the comparative sample glass I with zircon at the ratio shown in Table 5.

Each of the sample mixtures Nos. 1 to 12 was fired at 400° C. for 5 minutes and then cooled to form a body. The body was evaluated for various properties, and the measured data are shown in Tables 3 to 5.

It is obvious from Tables 3 to 5 that the sample mixtures Nos. 1 to 12 have large flow diameters of 27.5 to 29 mm, thermal expansion coefficients of 84 to 93×10$^{-7}$/°C. over the temperature range of 30° to 250° C. and residual stress of 450 to 690 psi (T).

TABLE 3

| Sample Mixture | 1 | 2 | 3 | 4 | 5 |
|---|---|---|---|---|---|
| Glass | A | B | B | C | D |
| Volume % | 82 | 70 | 68 | 80 | 67 |
| Filler | tin oxide | zircon | zinc silicate | lead titanate | zinc silicate |
| Volume % | 18 | 30 | 32 | 20 | 33 |
| Firing Condition | 400° C. 5 min | 400° C. 5 min | 400° C. 5 min | 400° C. 5 min | 400° C. 5 min |
| Flow Diameter (mm) | 27.6 | 27.5 | 27.7 | 28.7 | 28.3 |
| Thermal Expansion Coefficient (× 10$^{-7}$/°C.) | 93 | 86 | 85 | 85 | 84 |
| Residual Stress in Panel Glass (psi) | T 490 | T 640 | T 650 | T 660 | T 690 |
| Seal Geometry | Good | Good | Good | Good | Good |
| Pressure Test (kg/cm$^2$) | 6.0 or more | 6.0 or more | 6.0 or more | 6.0 or more | 6.0 or more |

TABLE 4

| Sample Mixture | 6 | 7 | 8 | 9 | 10 | 11 |
|---|---|---|---|---|---|---|
| Glass | D | D | D | E | F | G |
| Volume % | 73 | 67 | 80 | 65 | 67 | 80 |
| Filler | zinc silicate | tin oxide | lead titanate | tin oxide | tin oxide | lead titanate |
| Volume % | 27 | 33 | 20 | 35 | 33 | 20 |
| Firing Condition | 400° C. 5 min | 400° C. 5 min | 400° C. 5 min | 400° C. 5 min | 400° C. 5 min | 400° C. 5 min |
| Flow Diameter (mm) | 29.0 | 28.8 | 28.5 | 28.1 | 28.0 | 28.2 |
| Thermal Expansion Coefficient (× 10$^{-7}$/°C.) | 93 | 90 | 85 | 87 | 90 | 87 |
| Residual Stress in Panel Glass (psi) | T 500 | T 550 | T 680 | T 650 | T 600 | T 610 |
| Seal Geometry | Good | Good | Good | Good | Good | Good |
| Pressure Test (kg/cm$^2$) | 6.0 or more | 6.0 or more | 6.0 or more | 6.0 or more | 6.0 or more | 6.0 or more |

TABLE 5

| Sample Mixture | 12 | 13 | 14 |
|---|---|---|---|
| Glass | H | I | I |
| Volume % | 68 | 99 | 99 |
| Filler | tin oxide | zircon | zircon |
| Volume % | 32 | 1 | 1 |
| Firing Condition | 400° C. 5 min | 440° C. 40 min | 400° C. 5 min |
| Flow Diameter (mm) | 28.1 | 27.7 | 19.2 |
| Thermal Expansion Coefficient (× 10$^{-7}$/°C.) | 92 | 98 | 106 |
| Residual Stress in Panel Glass (psi) | T 570 | T 520 | C 350 |
| Seal Geometry | Good | Good | Bad |
| Pressure Test (kg/cm$^2$) | 6.0 or more | 5.8 or more | — |

Figure 2:
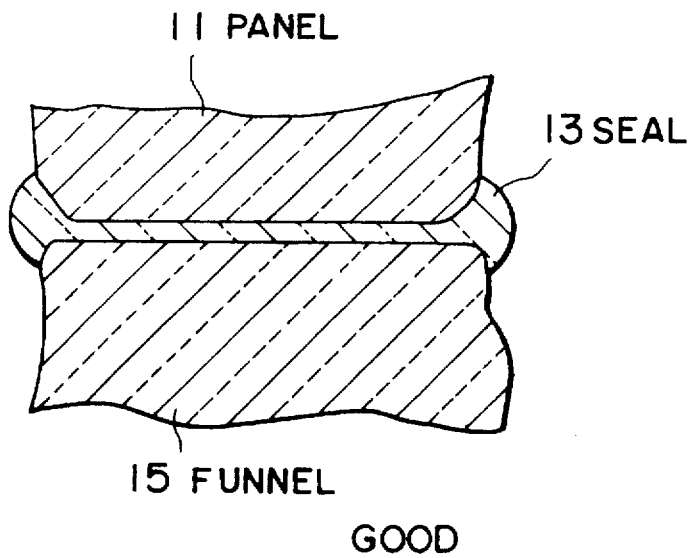
FIG. 2 is a sectional view of a seal of a color CRT in a good condition.

Referring to FIG. 2, those sample mixtures were used to form the seal 13 between the glass panel 11 and the glass funnel 15 of a 29-inch color CRT bulb by firing at 400° C. for 5 minutes. All the seals had a proper thickness of 0.15 to 0.3 mm and had a good seal geometry so that the seal 134 properly covered the inner- and the outer-surface of the glass bulb. They had neither any lack of flow nor any sagging.

The sealed bulbs were further subjected to a water pressure test. Since all of them did not break when the pressure reached 6 kg/cm$^2$, they have a durability of 6 kg/cm$^2$ or more.

Sample mixture No. 13 was fired at 440° C. for 40 minutes and its properties were evaluated in the same manner. As a result, they were similar to those of the sample mixtures Nos. 1 to 12.

Figure 3:
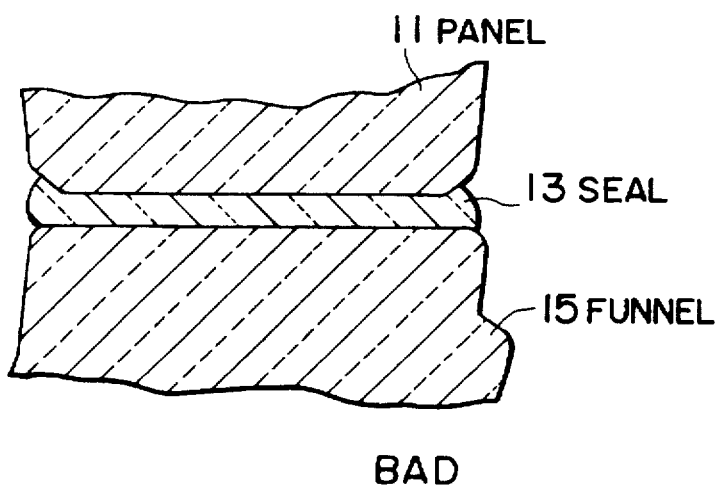
FIG. 3 is a sectional view of a seal in a bad condition.

Sample mixture No. 14, which has the same composition as sample No. 13, was fired under the same condition as for samples Nos. 1 to 12, that is, at 400° C. for 5 minutes, and its properties were evaluated in the same manner. As a result, it did not flow and its flow diameter was 19.2 mm. Crystals did not develop at all and a resultant thermal expansion coefficient was 106×10$^{-7}$/°C., which is too high to match the CRT parts. Accordingly, the panel having a seal with sample No. 14 has an abnormal residual stress of 350 psi (C). Moreover, sample No. 14 gave a bad seal geometry as shown in FIG. 3. It did not cover the panel 11 and the funnel 15.

In Tables 3 to 5, the flow diameter was obtained as follows. Sample powder of 10 g was button-pressed into a cylindrical body with a diameter of 20 mm. After the body was fired under the firing condition, its diameter was measured.

The thermal expansion coefficient was measured by a dilatometer for a fired rod of a sample. It was 40 mm in length and 4 mm in diameter.

The residual stress was measured as follows. The button-pressed body described in the measurement of the flow diameter was put on a panel glass which has a thermal expansion coefficient of 101×10$^{-7}$/°C., and was fired under the firing condition. Thereafter, the residual stress in the panel glass was measured by a polarimeter. In those Tables, T represents tension, and C, compression.

The water pressure test was carried out as follows. A 29-inch color CRT bulb was sealed with the sample mixture under the firing condition, and thereafter, put into a water tank. Water pressure outside the bulb was gradually increased to 6 kg/cm$^2$. It is generally required for the actual use that the bulb can stand more than 3.5 kg/cm$^2$ in this test.

With respect to the refractory filler powders used for the sample mixtures described above, tin oxide and zinc silicate under 250 mesh sieve and zircon and lead titanate under 350 mesh sieve were used.

What is claimed is:

1. A non-crystallizing sealing glass essentially consisting, by weight, of 65–80% of PbO, 5.5–8% of B$_2$O$_3$, 3–9% of ZnO, 7–22% of Bi$_2$O$_3$, 16% or more of ZnO+Bi$_2$O$_3$, 0.2–1% of SiO$_2$, 0.3–2% of Fe$_2$O$_3$, and 1.5–4.5% of Cs$_2$O.

2. A sealing composition comprising, by volume, 60–95% of non-crystallizing sealing glass powder and 40–5% of refractory filler powder, said sealing glass essentially consisting, by weight, of 65–80% of PbO, 5.5–8% of $B_2O_3$, 3–9% of ZnO, 7–22% of $Bi_2O_3$, 16% or more of ZnO+$Bi_2O_3$, 0.2–1% of $SiO_2$, 0.3–2% of $Fe_2O_3$, and 1.5–4.5% of $Cs_2O$.

3. A sealing composition as claimed in claim 2, wherein said refractory filler powder is at least one element selected from the group consisting of tin oxide, zinc silicate, lead titanate and zircon.

4. A sealing composition as claimed in claim 2, which has a thermal expansion coefficient of $80–95 \times 10^{-7}/°C$.

* * * * *